United States Patent
Granlund et al.

(10) Patent No.: US 8,060,125 B2
(45) Date of Patent: Nov. 15, 2011

(54) CONFIGURING METHOD AND APPARATUS

(75) Inventors: Seppo Granlund, Helsinki (FI); Arto Karppanen, Helsinki (FI); Eero Sillasto, Helsinki (FI); Enrico Rantala, Iittala (FI)

(73) Assignee: Nokia Corporation, Espoo (FI)

( * ) Notice: Subject to any disclaimer, the term of this patent is extended or adjusted under 35 U.S.C. 154(b) by 945 days.

(21) Appl. No.: 11/984,619

(22) Filed: Nov. 20, 2007

(65) Prior Publication Data

US 2009/0088108 A1 Apr. 2, 2009

(30) Foreign Application Priority Data

Sep. 28, 2007 (FI) .................................... 20075686

(51) Int. Cl.
*H04W 88/02* (2009.01)
(52) U.S. Cl. .................................................... 455/509
(58) Field of Classification Search ............... 455/435.2, 455/509, 512, 63.1, 450, 452.1, 452.2
See application file for complete search history.

(56) References Cited

U.S. PATENT DOCUMENTS

| 7,526,289 B2 * | 4/2009 | Schwarz et al. ............. 455/439 |
| 2003/0045249 A1 | 3/2003 | Nielsen |
| 2007/0123182 A1 | 5/2007 | Dekker |
| 2007/0165743 A1 | 7/2007 | McCallister |
| 2008/0039087 A1 * | 2/2008 | Gallagher et al. ......... 455/435.2 |
| 2008/0214220 A1 * | 9/2008 | Beziot et al. .................. 455/512 |

FOREIGN PATENT DOCUMENTS

| KR | 10/2005/0069500 A | 5/2005 |
| WO | WO 02/067603 A1 | 8/2002 |
| WO | WO 2007/044316 A1 | 4/2007 |
| WO | WO 2008/099341 A2 | 8/2008 |

OTHER PUBLICATIONS

International Search Report, PCT/FI2008/050592, dated Feb. 12, 2009.

* cited by examiner

*Primary Examiner* — Diane Mizrahi
(74) *Attorney, Agent, or Firm* — Squire, Sanders & Dempsey (US) LLP

(57) ABSTRACT

An apparatus, including a determining unit for determining one or more applicable radio selections including one or more radio interfaces for use by one or more communication applications, a ranking unit for ranking the applicable radio selections to an order of superiority according to a predefined ranking criterion, and a selecting unit for selecting a radio selection, of the one or more applicable radio selections, for use by the one or more communication applications on the basis of the order of superiority of the radio selections.

28 Claims, 2 Drawing Sheets

CONFIGURING METHOD AND APPARATUS

FIELD OF THE INVENTION

The invention relates to a method of configuring a multi-radio device, and a multi-radio device.

BACKGROUND

The future of mobile communication lies in no single radio technology. At the moment, a typical low-end mobile station carries GSM (Global System for Mobile Communications) based 2G ($2^{nd}$ Generation) radio and possibly its derivatives, such as EDGE (enhanced data rates for GSM evolution) and GPRS (general packet radio service). Mid-priced mobiles have WCDMA (wide-band code-division multiple access) based 3G ($3^{rd}$ Generation) radio that have very different characteristics from the mobile point of view when compared to GSM in terms of technology, bit rates, power consumption, etc., even if in the network side the backbone is said to be similar. A plurality of other radio technologies, such as 3.5G, 3.9G (or LTE (Long Term Evolution)), 4G are being introduced to the mobiles, and apart from the cellular radios, some mobile stations are already provided with WLAN (Wireless Local Area Network) and Bluetooth.

Using a mobile station will be very different from the user's perspective when multiple radios are available. Till now, when one starts for example a browser, one has to pre-configure or manually choose the connection that is the radio interface to be used by the browser. This is not acceptable from the user's point of view when plenty of radios are available. That is, a user may not be an expert on different radios, and configuring all of them is a difficult task. Some radios may be under the control of an operator and the operator might want to configure such connections. Furthermore, even if the user might be able to select and configure the radio connection he or she chose, the chosen radio may not be the optimum one not even by the user's standards. Different radios have different characteristics, and even if, for example, cost is probably quite straight forward for the user to make the decision with, measures like power consumption exist that are impossible for user the to optimize.

Thus a need exists to improve mechanisms in selecting a radio interface in a mobile station.

SUMMARY OF THE INVENTION

In an aspect, there is provided an apparatus comprising a determining unit configured to determine one or more applicable radio selections including one or more radio interfaces for use by one or more communication applications, a ranking unit configured to rank the applicable radio selections into an order of superiority according to a predefined ranking criterion, and a selecting unit configured to select, from among the one or more applicable radio selections, a radio selection for use by the one or more communication applications on the basis of the order of superiority of the radio selections.

In another aspect, there is provided a method comprising determining one or more applicable radio selections including one or more radio interfaces for use by one or more communication applications, ranking the applicable radio selections into an order of superiority according to a predefined ranking criterion, and selecting, from among the one or more applicable radio selections, a radio selection for use by the one or more communication applications on the basis of the order of superiority of the radio selections.

In another aspect, there is provided an apparatus, comprising means for determining one or more applicable radio selections including one or more radio interfaces for use by one or more communication applications, means for ranking the applicable radio selections to an order of superiority according to a predefined ranking criterion, and means for selecting, from among the one or more applicable radio selections, a radio selection for use by the one or more communication applications on the basis of the order of superiority of the radio selections.

In another aspect, there is provided a computer-readable medium having computer-executable components comprising determining one or more applicable radio selections including one or more radio interfaces for use by one or more communication applications, ranking the applicable radio selections to an order of superiority according to a predefined ranking criterion, and selecting, from among the one or more applicable radio selections, a radio selection for use by the one or more communication applications on the basis of the order of superiority of the radio selections.

BRIEF DESCRIPTION OF THE DRAWINGS

In the following, the invention will be described in greater detail by means of preferred embodiments and with reference to the accompanying drawings, in which.

DETAILED DESCRIPTION OF THE PREFERRED EMBODIMENTS

Figure 1:
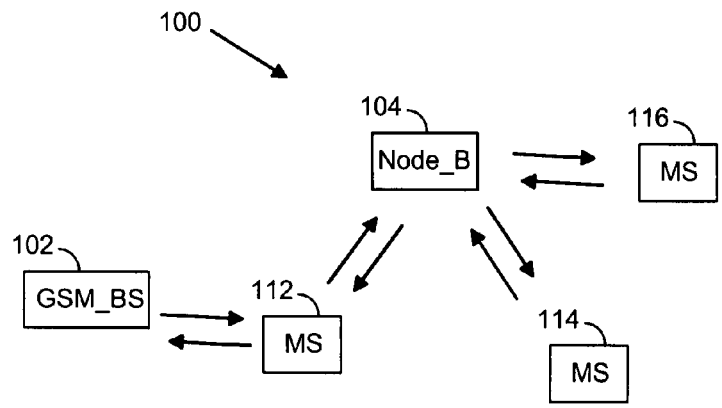
FIG. 1 shows an example of a communication system.

FIG. 1 shows an embodiment of a communication system 100. The embodiment of FIG. 1 shows two base stations, Node B 104 of a WCDMA system, and a GSM base station 102. Mobile stations 112, 114, 116 in the system may be single-radio or multi-radio devices. Besides mobile stations, multiple radios may be incorporated in portable computers, households, cars, and so on. As an example, the mobile station 112 is a multi-radio device which may establish radio connections to the GSM base station 102 and to the WCDMA Node B 104. In the multi-radio mobile station 112, one or more radio interfaces may be active simultaneously.

In a wireless service invocation, uplink transmission consumes a remarkable portion of the total battery energy of a mobile station. The uplink power level $P_{trans\_up}$ may be selected on the basis on the following:

L=path loss or signal attenuation of a downlink signal between base station and mobile station, $I_{up}$=the total uplink interference in base station, $SIR_{up}$=the signal to interference ratio that is needed to detect the terminal signal in the base station receiver.

In an embodiment, a wireless network may broadcast the parameter $I_{up}$, as in the case of WCDMA technology. The total interference level experienced by a base station, $I_{up}$, may include interference components of thermal noise, man-made noise and interference from mobile stations in the same or neighboring cells, for instance.

The mobile stations within the range of the base station may receive the total interference level of the base station and utilize it in defining appropriate level of uplink transmission power.

In a communication system, such as WCDMA, the terminal uplink transmission power may be adjusted so that a desired uplink signal for interference ratio $SIR_{up}$ is achieved $$SIR_{up} = \frac{P_{received\_up}}{I_{up}} = \gamma, \text{ where} \quad (1)$$

$P_{received\_up}$ = the received uplink power in the base station, $I_{up}$ = the uplink interference.

The mobile station may estimate the path loss L between the mobile station and base station on the basis of the received pilot signal strength. That is, the mobile station may have stored predefined information on the pilot signal power level when it was transmitted from the base station, and when comparing the relation of the received power level to the transmitted power level, the mobile station is able to determine the path loss between the base station and mobile station.

Using equation (1), we obtain $$\gamma = SIR_{up} = \frac{(P_{trans\_up}/L)}{I_{up}} \quad (2)$$

In equation (2), as explained above, L is a parameter that may be estimated in the mobile station, $SIR_{up}$ may be stored in a mobile station, and $I_{up}$ may be received from a base station as broadcast information. Similar parameters will also be available in upcoming radio technologies like LTE and WiMAX. As the other parameters in (2) are known, it is possible to predict/estimate $P_{trans\_up}$ in the mobile station. A multi-radio mobile station may carry out such estimation for various available radio access networks and select an access network based on the estimation. In an embodiment, a multi-radio terminal may select an access network such that energy consumption (uplink transmit power) is minimized.

By using decibel units, one can derive from equation (2) the following equation:

$$P_{trans\_up}[dBm] = \gamma[dB] + L[dB] + I_{up}[dBm] \quad (3)$$

Equation (3) can be refined to also include antenna gain G.

$$P_{trans\_up}[dBm] = \gamma[dB] + L[dB] + I_{up}[dBm] - G[dB] \quad (4)$$

A mobile station may use an equation of type (4) to estimate the uplink transmission power. The estimation may be carried out in a random access phase before connection setup, because all the needed information is available in the mobile station in the random access phase. The estimated power level in a selected network may then be applied in the connection setup phase and in the data transmission phase.

When the needed transmit power has been estimated for various applicable available access networks, the mobile station may select a network that indicates minimal transmission power $P_{trans\_up}$ for the mobile station. In this way, the terminal is capable to save the battery energy. The accuracy of the quantities L and $I_{up}$, used in equation (4), may be improved by collecting a time series of such values during a suitable period of time. Based on such mathematical methods, it is possible to improve the estimates for L and $I_{up}$. It is then also possible to derive an estimate for $P_{trans\_up}$ that is valid and should be applied by the mobile station for a certain time period.

Figure 2:
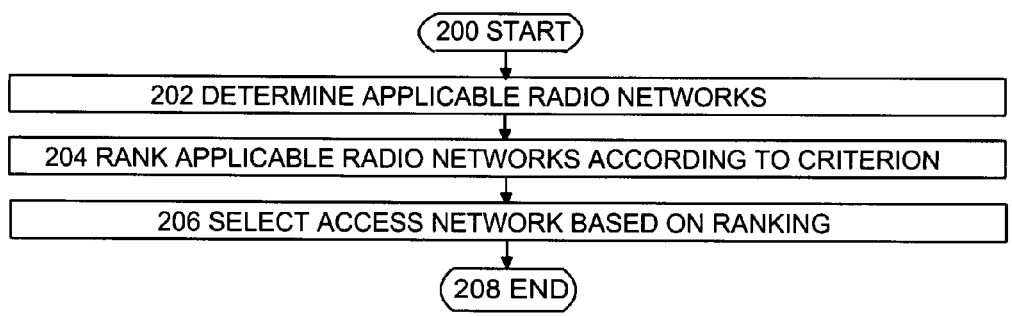
FIG. 2 shows an embodiment of a method.

FIG. 2 shows an embodiment of a method. The method may be applied to a mobile station, for instance, and the method may aim to minimizing uplink transmission power in the mobile station.

In 202, the mobile station determines the applicable/available radio access selections for uplink transmission. Each selection may include one or more access networks, which may be cellular or other radio networks. If the selection includes more than one network, the mobile station may divide uplink data transmission between the access networks of the selection.

Herein, an applicable radio network means a network, which fulfils the communication needs of the mobile station. One criterion for such an applicable network is that the mobile station is within the operation range of the network. Other criteria may include cost, bit rate or quality, for instance. Cost is an example of a criterion which may be predefined for the mobile station by a user of the mobile station. The user may, for instance, set a price limit and the mobile station updates a list of applicable access networks within the limits set by the price limit. Some other criteria may be application-dependent, such as bit rate, for instance. The application used by the user may know the momentary bit-rate requirements of an application and update the list of applicable access networks to meet this requirement. Quality may be used by the application automatically, that is the application checks that the quality offered by the network is sufficient to fulfil the needs of the application. Quality may also include a criterion set by the user. The user may define in the mobile phone that only cellular networks may be used for voice calls, for instance.

The communication needs of the mobile station may include more than one application running in parallel. An algorithm looking for the applicable networks may then include only selections where the limitations and needs of all the applications running in parallel are fulfilled.

In 204, the applicable networks are ranked according to a predetermined criterion. The criterion may be the needed uplink transmit power, for instance. The mobile station may then select an access network which minimizes the power consumption in the mobile station.

In 206, a best-ranked selection including one or more access networks is selected for the desired communication task in the mobile station.

Figure 3:
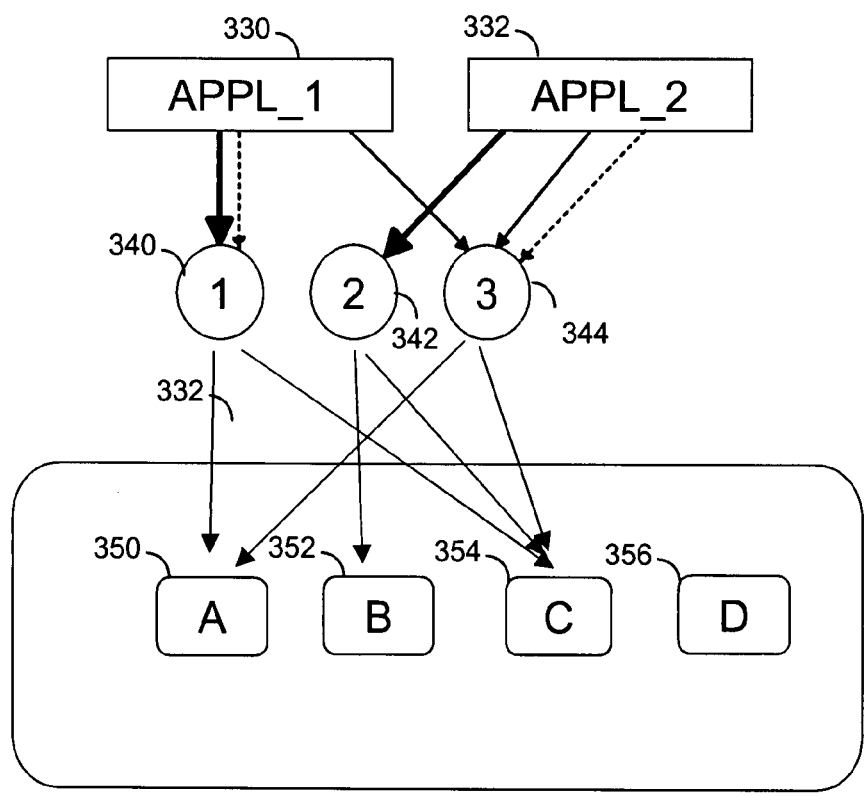
FIG. 3 highlights operation of an apparatus.

FIG. 3 shows an embodiment of an apparatus. The goal in the embodiment is to optimize resource usage in a multi-radio capable mobile station when more than one radio is available, and one or a combination thereof shall be used to fulfil the communication needs of the device. This is carried out by estimating device's resource loadings separately for each radio selection and by choosing the most appropriate radio selection.

In FIG. 3, the mobile station may include a plurality of applications, of which two applications 330 and 332 are shown. An application may be a voice call or a data upload session, for instance. The mobile station is equipped with radio communication equipment capable of providing the mobile station with a radio communication interface to a respective radio system 340, 342, 344. As an example, the radio systems 340, 342 and 344 may be WCDMA, GSM, and WLAN, respectively.

FIG. 3 also shows a resource layer of the mobile device. The resource layer includes resources A 350, B 352, C 354, and D 356, which may be any physical or logical item that has limited capacity. A physical resource may herein mean a chip or unit, display, radio parts and other larger components, for instance. In a more detailed approach, the resource may mean a CPU (Central Processing Unit), DSP (Digital Signal Processor), memory or bus of the mobile station, for instance. A logical resource may mean a maximum number of bearers or the number of data packets or bits per time unit, for instance. The resources may be more or less dependent on or independent of one another meaning that the energy consumption of one resource may or may not affect the energy consumption of one or more other resources.

FIG. 3 shows two applications requiring radio connections for their needs. The mobile station may have multiple radio interfaces, more than the three shown in FIG. 3, implemented, but the three radio interfaces 340, 342, and 344 of all the implemented radio interfaces are applicable to/available in this example for the applications. Other implemented radio interfaces in the mobile station may be out of coverage, or not fulfilling the user's or application's requirements, such as one or more of bit rate, cost, quality of service, delay, security, accessibility, for instance.

Different radio interfaces utilize the resources 350 to 356 in a non-equal manner. They may use different resources and they load different resources differently. Based on the available radios and the requirements, possible radio selections may be defined. A possible radio selection is any combination of the available radios that fulfils the requirements. Different radio selections are highlighted in FIG. 3 with different arrows from application 1 (330) and application 2 (332) to different radios. The first selection, shown by bold arrows, includes radio 1 for application 1 and radio 2 for application 2. The second selection, shown by narrow arrows, includes radio 3 for both applications. The third selection, shown by dashed lines, includes radio 1 for application 1 and radio 3 for application 3.

TABLE 1

Loading table

| | A (60%) | B (100%) | C (100%) | D (100%) |
|---|---|---|---|---|
| Selection 1 (1&2) | 20% | 80% | 80% | — |
| Selection 2 (3) | 70% | — | 70% | — |
| Selection 3 (1&3) | 30% | — | 30% | — |

The four resources A to D are shown in the columns of table 1. There may possibly be also other applications running or anticipated to become running in the mobile station at the same time, and therefore the available resources are not fully usable for the radios. The available resource budgets herein are 60%, 100%, 100%, and 100% for the resources A, B, C and D, respectively.

The loading table also shows the estimated loading in each resource for every radio selection. Such loading figures may have been determined beforehand on the basis of prior knowledge of the loading caused by the application. The figures may be stored in a database or memory of a mobile station and read from the memory when the radio selections are ranked into an order of superiority according to a predetermined criterion, such as loading.

The radio selections load the resources differently. Other, non-radio related applications also load the same resources—and the loading is time dependent. This is a challenge for the decision-making functionality, which may estimate this background load to some extent in the future. In another embodiment, the decision making process for selecting an optimal radio selection may be performed periodically, using e.g. timers or triggering events.

In the example of FIG. 2 and Table 1, radio selection 2 does not fulfil the load budget of resource A as it requires 70% of loading and only 60% is available. Selection 1 gives more room for resource A, and may be selected if it is known, for example, that no additional load need to be put into B or C. On the other hand, selection 3 evens the resource usages down to 30%. Thus, if the selection criterion is to give as much room for A as possible, selection 1 might be selected. If the selection criterion is, however, an even distribution of loading, selection 3 would be more appropriate than selection 1.

We may consider another embodiment relating to FIG. 3. In this embodiment, more knowledge of the resource usage is provided, and, therefore, more advanced decision-making may also be involved.

Typically, the amount a radio connection consumes of a resource is not a constant, but depends for example on the bit rate, packet rate, packet size distribution, etc. Such dependencies can be determined in advance, and functions, models and methodologies may be defined for the dependencies.

In Table 2, the loading table has a variable x that could be, for example, bit rate (in uplink, downlink or combined in both directions), packet rate (UL/DL/combined/etc.), packet size (average/median/typical, etc.) or some corresponding variable that is known to affect the loading of any resource. Some of the resources do not necessarily depend on the variable.

TABLE 2

Loading table

| | A (60%) | B (100%) | C (100%) | D (100%) |
|---|---|---|---|---|
| Sel. 1 (1&2) | 20% | 0.2% * x | 60% + 0.5% * x | — |
| Sel. 2 (3) | 20% + 1% * x | — | 40% + 0.5% * x | — |
| Sel. 3 (1&3) | 10% + 0.1 * x | — | 10% + 0.1 * x | — |

Another table, a selection table of which an example is shown in Table 3 may also be provided. In this example, the different resources can accommodate different maximal x values. These maximal values of the variable x are evaluated in the selection table. For instance, value 40 in Table 3 has been obtained from formula 20%+1%*x=60% in Table 2. For each radio selection the resource that has the smallest value x is a bottleneck, and that resource limits the radio connection. The radio selection that maximizes x is the optimal choice, that is the selection criterion is maxmin (maximizing the minimum value for each selection). In such a case, it would be selection 3 as it can accommodate x of value 500, compared to values 80 and 40 in selections 1 and 2, respectively.

TABLE 3

Selection table

| | A (60%) | B (100%) | C (100%) | D (100%) |
|---|---|---|---|---|
| Sel. 1 (1&2) | — | 150 | 80 | — |
| Sel. 2 (3) | 40 | — | 120 | — |
| Sel. 3 (1&3) | 500 | — | 900 | — |

Tables 4 to 6, still relating to FIG. 3, show still another example. In this embodiment, the loads of the resources are dependent on two variables, x and y. We may assume that x relates to application 1 and y to application 2. We consider this only as an example and the variables need not be application-specific, but they may be general variables like battery lifetime or temperature, or resource-specific, like voltage, or radio-specific like QoS (Quality of Service), and so on.

As Table 4 shows, the loading table may include linear and also non-linear dependencies.

The selection of the radio is now more difficult, as the decision of the selection may be made in favour of one application over the other, or trying to make them perform equally in some sense. We may consider a scenario in which both of the applications have minimum requirements of their own in terms of x and y, and the rest of the resources are optimized for application 1 and its associated variable x in the loading table.

An additional loading table, Table 5, shows how much the minimum requirements for the applications (x=10, y=15) create additional load for the resources.

The rest, up to the resource limit, is then used for obtaining the greatest possible value of x. A selection table, Table 6, shows now how each of the resources limits the x value. For instance, value 385 in Table 6 is obtained by applying from the maximum load of resource A (60%), keeping y in its minimum allowable value (y=15), and maximizing x. When this information is inserted into the formula of Table 4, we obtain: 20%+0.1%*x+0.1%*15=60%, which gives the x value 385 in Table 6.

Radio selection 1 is the best on a maxmin-criterion, that is it has the greatest minimum value being able to reach up to x=355, and that should be the selected multi-radio combination.

TABLE 4

Loading table

| | A | B | C | D |
|---|---|---|---|---|
| Sel. 1 (1&2) | 20% | 0.2% * y | 60% + 0.1% * x + 0.3 * y | — |
| Sel. 2 (3) | 20% + 0.1% * x + 0.1% * y | — | 40% + 0.4% * x + 0.1% * y | — |
| Sel. 3 (1&3) | 10% + 0.05 * x + 0.1 * y | — | 10% + 0.1 * x + 0.2 * x * y | — |

TABLE 5

Additional load

| | A (60%) | B (30%) | C (100%) | D (100%) |
|---|---|---|---|---|
| Sel. 1 (1&2) | 20% | 3% | 65.5% | — |
| Sel. 2 (3) | 22.5% | — | 45.5% | — |
| Sel. 3 (1&3) | 12% | — | 41% | — |

TABLE 6

Selection table

| | A (60%) | B (30%) | C (100%) | D (100%) |
|---|---|---|---|---|
| Sel. 1 (1&2) | — | — | 355 | — |
| Sel. 2 (3) | 385 | — | 146 | — |
| Sel. 3 (1&3) | 970 | — | 29 | — |

Besides maximizing a variable, such as bit rate, for instance, a variable may also be minimized. This type of optimization may be applied when trying to keep loading of a resource on a low level.

We may consider a further example of Table 7, still relating to FIG. 3, where the energy consumption of the resources is the decisive factor on the basis of which a radio selection is made. In table 7, available prior information associated with the implementation is provided that indicates the energy consumptions in each resource. In table 7, it can be seen that the different selections load different resources differently.

TABLE 7

Consumption table

| | A | B | C | D | SUM |
|---|---|---|---|---|---|
| Sel. 1 (1&2) | 5.3 | 0.3 | 2 | — | 7.6 |
| Sel. 2 (3) | 3 | — | 9 | — | 12 |
| Sel. 3 (1&3) | 1.2 | — | 3 | — | 4.2 |

The total consumption is the sum of all consumed powers in each of the relevant resources. For instance, for selection 1, the sum is formed on the basis of energy consumptions of A, B, and C used by selection 1. When using minimizing of the total energy consumption (sum) as a criterion, the best choice is radio selection 3 as its total consumption is the smallest, 4.2.

Tables 8 and 9 show another example in which the power consumption of the resources depends on a parameter x.

As the total power consumption is again the sum of all resources, it can be expressed as a function of the parameter x. Depending on the needs, the energy may be estimated/calculated and stored for any x value. In Table 9, the total consumed powers for x values of 10 and 100 are shown. If x is to be 10, radio selection 3 that is the power optimal selection, because it has the lowest total energy consumption value. But if x is to be 100, radio selection 2 is the most optimal selection in terms of energy consumption.

TABLE 8

Consumption table

| | A | B | C | D | SUM |
|---|---|---|---|---|---|
| Sel. 1 (1&2) | 2 | 0.2 * x | 6 | — | 8 + 0.2 * x |
| Sel. 2 (3) | 3 + 0.01 * x | — | 4 | — | 7 + 0.01 * x |
| Sel. 3 (1&3) | 2 | — | 1 + 0.1 * x | — | 3 + 0.1 * x |

TABLE 9

Selection table

| | x = 10 | x = 100 |
|---|---|---|
| Sel. 1 (1&2) | 10 | 28 |
| Sel. 2 (3) | 7.1 | 8 |
| Sel. 3 (1&3) | 4 | 13 |

In an embodiment, the loading of the resource may affect the energy consumption furthering addition, the resources may also be connected to each other. As the resources may share the voltage or the clock, for instance, use of a shared resource affects the performance of all connected resources. Therefore, the energy consumptions may also be connected—especially when power saving features like DFVS (Dynamic Voltage and Frequency Scaling) is used. In such case, the scaling of the frequency or the voltage may have to be taken into account in all relevant resources. Power saving properties of the resources may differ greatly from one another and the use of power saving features may change the order of superiority of the selections.

In FIG. 3, resource D is not in active use in any of the radio selection cases, but it may be connected to resources A and C, for instance, and use considerable amount of energy. For example this might be the case when CPU and DSP, i.e. two separate resources, share the same voltage and frequency. Although DSP is idle in loading, DSP cannot be set into a highly energy saving mode as the voltage and frequency must be chosen so that the active CPU manages its tasks.

Figure 4:
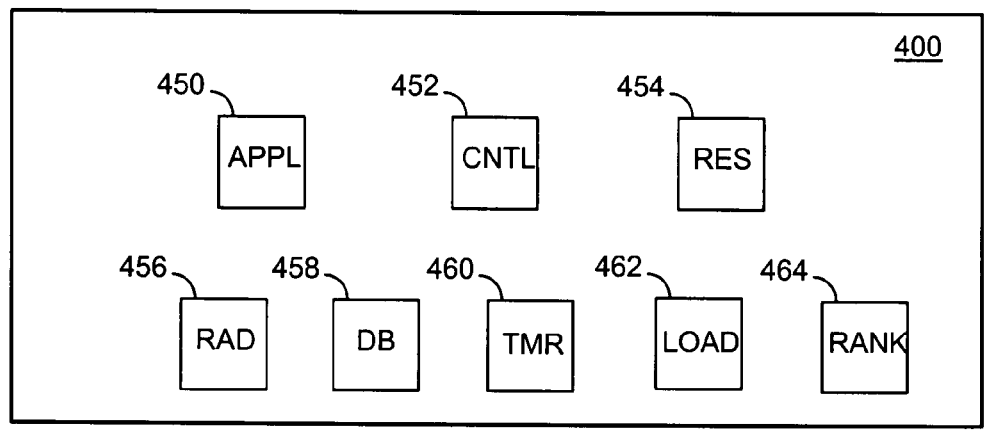
FIG. 4 shows an embodiment of an apparatus.

FIG. 4 shows a block diagram of an apparatus. For the sake of clarity, no connections between the blocks are indicated. The apparatus of FIG. 4 may be a mobile phone or a module for a mobile phone, for instance. Instead of a mobile phone, the apparatus may be provided in any device that faces the task of selecting between a plurality of available radio interfaces.

The apparatus 400 includes an application unit APPL 450. The application unit may be configured to perform tasks needed to run applications in the apparatus. The applications may include a voice call, downloading or uploading of data from/to a radio network or a multimedia service, for instance. To perform its task, an application has certain requirements for a radio service to be used for carrying out the task. More than one application may be running in the apparatus simultaneously.

The different radio interfaces of the apparatus, such as a mobile phone, for instance, are implemented by using a radio unit RAD 456. The radio unit may provide a two-directional communication link to a base station of a radio communication network. Via a downlink communication link, the mobile station may receive information on the total uplink interference level in a base station. The mobile station may also receive a pilot signal from a base station and estimate path loss between the base station and the mobile station. For this purpose, the mobile station may have stored the transmit power level of the pilot signal in the storing unit DB 458, for instance. The power level of the received signal may be estimated in the radio module RAD 456, for instance.

The different radio interfaces may at least partly share the resources of the apparatus provided by a resource unit RES 454. The resources may be physical or logical resources of the device. Different radio interfaces may cause different load on the resources.

FIG. 4 also shows a control unit CNTL 452, which controls the operation of the device and also provides co-operation between the different modules of the apparatus. For instance, the control unit may select suitable resources for use by different applications and take into account the limitations and requirements of the other modules of the device. The control unit may also define a set of applicable radio selections for use by an application.

The apparatus may include a storing unit DB 458, which may store different tables in the apparatus. The apparatus may store tables for indicating the load of the radio selections on different resources or the energy consumption of the radio selections on the different resources, for instance. The tables and the information therein may be stored in a database or some corresponding memory object, for instance.

The mobile station may also include a timer TMR 460. The timer may indicate moments of time at which the device should repeat the selection of the most optimal radio selections. Alternatively or in addition to, the selection of the radio interfaces may be carried out during or before a connection setup or when starting an application, for instance. Furthermore, the radio selections may be updated when changes in required communication needs of an application occur, which may be the case if the application is capable of informing about its needs. The applicable radio selections may also be updated when changes occur in the resource usage of the apparatus, which may the case when background load increases due to starting of a new application, which may not necessarily need any radio communication interface.

A loading unit LOAD 462 may calculate new values for loading tables if they are dependent on a variable, for instance. A ranking unit RANK 464 may rank the applicable radio selections into an order of superiority. The ranking unit may rank the radio selections on the basis of minimizing uplink transmission power, minimizing energy consumption or minimizing load of the apparatus, for instance.

Embodiments of the invention or parts thereof may be implemented as a computer program comprising instructions for executing a computer process for implementing the method according to the invention.

The computer program may be stored on a computer program distribution medium readable by a computer or a processor. The computer program medium may be, for example but not limited to, an electric, magnetic, optical, infrared, or semiconductor system, device or transmission medium. The computer program medium may include at least one of the following media: a computer readable medium, a program storage medium, a record medium, a computer readable memory, a random access memory, an erasable programmable read-only memory and computer readable printed matter.

Solutions other than computer program implementation ones are also possible, such as different hardware implementations (entities or modules), such as a circuit built of separate logics components or one or more client-specific integrated circuits (Application-Specific Integrated Circuit, ASIC). A hybrid of these implementations is also feasible.

It will be obvious to a person skilled in the art that as technology advances, the inventive concept can be implemented in various ways. The invention and its embodiments are not limited to the examples described above but may vary within the scope of the claims.

The invention claimed is:

1. An apparatus comprising:
a processor; and
a memory including computer program code, the memory and the computer program code configured to, with the processor, cause the apparatus at least to
determine one or more applicable radio selections including one or more radio interfaces for use by one or more communication applications;
rank the applicable radio selections into an order of superiority according to a predefined ranking criterion; and
select, from among the one or more applicable radio selections, a radio selection for use by the one or more communication applications on the basis of the order of superiority of the radio selections.

2. An apparatus according to claim 1, wherein the predefined ranking criterion is energy consumption of uplink transmission in a mobile station, and wherein the memory and the computer program code are further configured to, with the processor, cause the apparatus at least to select the radio selection that minimizes uplink transmission power.

3. An apparatus according to claim 2, wherein the memory and the computer program code are further configured to, with the processor, cause the apparatus at least to rank the radio applicable radio selections into an order of superiority on the basis of uplink transmission power formed on the basis of a path-loss estimate between the mobile station and a base station, a total uplink interference estimate experienced by the base station and a predefined quality criterion of uplink transmission from the mobile terminal to the base station.

4. An apparatus according to claim 3, wherein the memory and the computer program code are further configured to, with the processor, cause the apparatus at least to
receive a pilot signal from the base station; and
estimate the path loss estimate of downlink transmission from the base station to the mobile station on the basis of a known transmit power level of the pilot signal and an actual power level of the received pilot signal.

5. An apparatus according to claim 3, wherein the memory and the computer program code are further configured to, with the processor, cause the apparatus at least to
receive the total uplink interference estimate experienced and broadcasted by the base station.

6. An apparatus according to claim 3, wherein the memory and the computer program code are further configured to, with the processor, cause the apparatus at least to
store the predefined quality criterion of uplink transmission required by the base station.

7. An apparatus according to claim 1, wherein the memory and the computer program code are further configured to, with the processor, cause the apparatus at least to select the radio selection for use by the one or more communication applications before a connection is setup.

8. An apparatus according to claim 1, wherein the predefined ranking criterion comprises loading of one or more resources of a mobile station, and wherein the memory and the computer program code are further configured to, with the processor, cause the apparatus at least to rank the radio selections on the basis of minimizing the loading of one or more resources used by the one or more communication applications.

9. An apparatus according to claim 1, wherein the predefined ranking criterion comprises energy consumption of one or more resources of a mobile station, and wherein the memory and the computer program code are further configured to, with the processor, cause the apparatus at least to rank the radio selections on the basis of minimizing the energy consumption of the one or more resources used by the one or more communication applications.

10. An apparatus according to claim 1, wherein the predefined ranking criterion comprises loading of one or more resources of a mobile station, and wherein the memory and the computer program code are further configured to, with the processor, cause the apparatus at least to rank the radio selections on the basis of obtaining a loading distribution of the resources.

11. An apparatus according to claim 1, wherein the one or more applicable radio selections include radio selections where a load affected by the radio selection is equal to or less than an available loading budget for a resource of the apparatus.

12. An apparatus according to claim 1, wherein the memory and the computer program code are further configured to, with the processor, cause the apparatus at least to
store predefined ranking criterion estimates of radio selections to one or more resources of the apparatus, and wherein the memory and the computer program code are further configured to, with the processor, cause the apparatus at least to rank the radio selections on the basis of the stored predefined ranking criterion estimates.

13. An apparatus according to claim 1, wherein the memory and the computer program code are further configured to, with the processor, cause the apparatus at least to
store ranking criterion estimates of the radio selections to one or more resources of the apparatus, wherein at least some of the ranking criterion estimates include one or more variables.

14. An apparatus according to claim 13, wherein the memory and the computer program code are further configured to, with the processor, cause the apparatus at least to rank the radio selections on the basis of optimizing the one or more variables.

15. An apparatus according to claim 1, wherein the one or more applicable radio selections include radio selections which meet service availability and quality requirements of the one or more communication applications.

16. An apparatus according to claim 1, wherein the apparatus is configured to operate as a part of a mobile station.

17. A method comprising:
determining, using a control unit, one or more applicable radio selections including one or more radio interfaces for use by one or more communication applications;
ranking, using the control unit, the applicable radio selections into an order of superiority according to a predefined ranking criterion; and
selecting, using the control unit, from among the one or more applicable radio selections, a radio selection for use by the one or more communication applications on the basis of the order of superiority of the radio selections.

18. A method according to claim 17, wherein the one or more applicable radio selections are ranked according to energy consumption of uplink transmission in a mobile station, and the selection of the radio selection comprises selecting the radio selection that minimizes uplink transmission power.

19. A method according to claim 18, wherein the applicable radio selections are ranked into an order of superiority on the basis of uplink transmission power formed on the basis of a path-loss estimate between the mobile station and a base station, and a total uplink interference estimate experienced by the base station and a predefined quality criterion of uplink transmission from the mobile terminal to the base station.

20. A method according to claim 17, wherein the applicable radio selections are ranked on the basis of a loading capacity of one or more resources of a mobile station, and a radio selection for use by one or more communication applications that minimizes the load of the one or more resources is selected.

21. A method according to claim 17, wherein the applicable radio selections are ranked on the basis of energy consumption of one or more resources of a mobile station, and a radio selection for use by one or more communication applications that minimizes the energy consumption of the one or more resources is selected.

22. An apparatus, comprising:
determining means for determining one or more applicable radio selections including one or more radio interfaces for use by one or more communication applications;
ranking means for ranking the applicable radio selections to an order of superiority according to a predefined ranking criterion; and
selecting means for selecting, from among the one or more applicable radio selections, a radio selection for use by the one or more communication applications on the basis of the order of superiority of the radio selections.

23. An apparatus according to claim 22, further comprising:
radio selection ranking means for ranking the applicable radio selections according to energy consumption of uplink transmission in a mobile station; and
radio selection means for selecting a radio selection that minimizes uplink transmission power.

24. An apparatus according to claim 23, further comprising:
radio ranking means for ranking the radio interfaces to an order of superiority on the basis of uplink transmission power formed on the basis of a path loss estimate between the mobile station and a base station, total uplink interference estimate experienced by the base station, and a predefined quality criterion of uplink transmission from the mobile terminal to the base station.

25. An apparatus according to claim 22, further comprising:
    radio selection ranking means for ranking the applicable radio selections on the basis of load of one or more resources of a mobile station; and
    radio selection selecting means for selecting the radio selection for use by one or more communication applications that minimizes the load of the one or more resources.

26. An apparatus according to claim 22, further comprising:
    radio selection ranking means for ranking the applicable radio selections on the basis of energy consumption of one or more resources of a mobile station; and
    radio selecting means for selecting the radio selection for use by one or more communication applications that minimizes the energy consumption of the one or more resources.

27. A computer program embodied on non-transitory a computer readable medium, the computer program being configured to control a processor to perform:
    determining one or more applicable radio selections including one or more radio interfaces for use by one or more communication applications;
    ranking the applicable radio selections to an order of superiority according to a predefined ranking criterion; and
    selecting, from among the one or more applicable radio selections, a radio selection for use by the one or more communication applications on the basis of the order of superiority of the radio selections.

28. A computer program according to claim 27, the non-transitory computer-readable medium comprising one or more of a program storage medium, a record medium, and a computer readable memory.

* * * * *